United States Patent
Bush

(10) Patent No.: US 9,464,422 B2
(45) Date of Patent: Oct. 11, 2016

(54) SYSTEM AND METHOD FOR A DIAPHRAGM VALVE CONTROLLED THROUGH MEASUREMENT OF WATER PRESSURE AND SOLENOID OPENING TIME

(71) Applicant: SDB IP Holdings, LLC, Oviedo, FL (US)

(72) Inventor: Shawn D. Bush, Orlando, FL (US)

(73) Assignee: SDB IP Holdings, LLC, Oviedo, FL (US)

(*) Notice: Subject to any disclaimer, the term of this patent is extended or adjusted under 35 U.S.C. 154(b) by 133 days.

(21) Appl. No.: 14/208,832

(22) Filed: Mar. 13, 2014

(65) Prior Publication Data

US 2014/0261783 A1 Sep. 18, 2014

Related U.S. Application Data

(60) Provisional application No. 61/787,438, filed on Mar. 15, 2013.

(51) Int. Cl.
| | |
|---|---|
| E03D 5/10 | (2006.01) |
| G01F 1/36 | (2006.01) |
| G05D 7/06 | (2006.01) |
| F16K 31/40 | (2006.01) |

(52) U.S. Cl.
CPC .............. *E03D 5/10* (2013.01); *F16K 31/402* (2013.01); *G01F 1/363* (2013.01); *G05D 7/0676* (2013.01); *Y10T 137/0379* (2015.04); *Y10T 137/776* (2015.04); *Y10T 137/7761* (2015.04)

(58) Field of Classification Search
CPC .................. Y10T 137/7761; Y10T 137/7764; Y10T 137/7769; Y10T 137/777; Y10T 137/0379; E03D 5/10; G01F 1/363; G05D 7/0676; F16K 31/402
USPC ....... 137/487.5, 489, 492, 492.5; 251/30.01; 335/219
See application file for complete search history.

(56) References Cited

U.S. PATENT DOCUMENTS

| | | | | |
|---|---|---|---|---|
| 3,061,264 A | * | 10/1962 | Rupert | E03D 3/04 251/30.05 |
| 4,301,992 A | * | 11/1981 | Karbo | F16K 31/402 251/30.02 |
| 4,333,491 A | * | 6/1982 | Knubley | B60S 5/046 137/116.3 |
| 4,336,918 A | * | 6/1982 | Karbo | F16K 31/402 251/30.02 |
| 4,477,051 A | * | 10/1984 | Ben-Yehuda | F16K 31/402 251/298 |
| 4,787,413 A | | 11/1988 | Saggers | |
| 4,797,820 A | | 1/1989 | Wilson et al. | |
| 4,893,645 A | * | 1/1990 | Augustinas | F16K 31/402 137/315.03 |
| 5,125,621 A | * | 6/1992 | Parsons | E03D 3/06 251/30.03 |

(Continued)

*Primary Examiner* — William McCalister
(74) *Attorney, Agent, or Firm* — The Webb Law Firm

(57) ABSTRACT

A flush valve system is provided having an inlet and an outlet, and a main valve element adapted for transition between a closed position and an open position is disclosed. The flush valve further includes a control chamber in communication with the inlet, and a vent outlet in communication with the outlet. The system includes a solenoid for establishing communication between the control chamber and the vent outlet to establish a pressure differential across a portion of the main valve element. The system also includes a power supply for energizing the solenoid, a deployable actuator in communication with the power supply, and a microprocessor in electrical communication with the main valve element. The microprocessor is adapted to determine a valve opening time, calculate fluid pressure based on the valve opening time, and deliver a predetermined quantity of fluid through the valve based on fluid pressure.

15 Claims, 7 Drawing Sheets

(56) References Cited

U.S. PATENT DOCUMENTS

| | | | | |
|---|---|---|---|---|
| 5,155,870 A * | 10/1992 | Tsutsui | E03D 5/10 | 4/300 |
| 5,362,265 A * | 11/1994 | Gervais | B63H 20/36 | 440/88 N |
| 5,363,873 A * | 11/1994 | Richmond | F16K 31/404 | 137/1 |
| 5,539,938 A * | 7/1996 | Tubbs | E03D 1/142 | 4/213 |
| 5,573,032 A * | 11/1996 | Lenz | G05D 7/005 | 137/486 |
| 5,853,026 A | 12/1998 | Wlodarczyk et al. | | |
| 6,000,674 A | 12/1999 | Cheng | | |
| 6,189,563 B1 * | 2/2001 | Taylor | F16K 31/1245 | 137/487.5 |
| 6,382,586 B1 * | 5/2002 | Wilson | F16K 31/40 | 251/30.02 |
| 6,394,413 B2 * | 5/2002 | Lohde | F16K 31/402 | 251/129.03 |
| 6,408,448 B1 * | 6/2002 | Jermier | E03D 9/10 | 4/300 |
| 6,409,046 B1 * | 6/2002 | Peckels | B67D 3/0041 | 222/1 |
| 6,508,268 B1 * | 1/2003 | Kouketsu | F16K 1/46 | 137/487.5 |
| 6,557,580 B2 | 5/2003 | Lohde et al. | | |
| 6,715,506 B1 * | 4/2004 | Ikushima | B05C 5/0225 | 118/684 |
| 6,745,634 B2 * | 6/2004 | Beck | B60T 8/368 | 303/119.3 |
| 6,843,271 B2 * | 1/2005 | Weldon | F16K 24/04 | 123/516 |
| 6,985,060 B2 * | 1/2006 | Parker | B60T 8/363 | 303/119.2 |
| 7,346,434 B2 * | 3/2008 | Goza | G05D 7/0635 | 700/282 |
| 2002/0162166 A1 * | 11/2002 | Saar | E03D 5/105 | 4/302 |
| 2002/0167220 A1 * | 11/2002 | Cunkelman | B60T 13/665 | 303/128 |
| 2004/0232370 A1 * | 11/2004 | Parsons | E03D 3/02 | 251/129.04 |
| 2012/0090702 A1 | 4/2012 | Shalev | | |
| 2012/0205568 A1 | 8/2012 | Bush | | |

* cited by examiner

SYSTEM AND METHOD FOR A DIAPHRAGM VALVE CONTROLLED THROUGH MEASUREMENT OF WATER PRESSURE AND SOLENOID OPENING TIME

CROSS-REFERENCE TO RELATED APPLICATION

The present application claims priority to U.S. Provisional Patent Application No. 61/787,438, entitled "System and Method for a Diaphragm Valve Controlled Through Measurement of Water Pressure and Solenoid Opening Time" filed Mar. 15, 2013, the entire disclosure of which is hereby incorporated by reference.

BACKGROUND OF THE INVENTION

1. Field of the Invention

This invention relates generally to diaphragm valves and, in one particular embodiment, to a diaphragm valve including electrical components for monitoring the change in fluid pressure through the valve over time.

2. Description of Related Art

In most waste water systems, such as the flushing systems for urinals, commodes, and the like, the valves associated with these systems are traditionally metal valves. Metal valves provide strength for withstanding high-pressure fluctuations that may occur in the water pressure of the flushing system and also maintain their ability to function over prolonged and consistent use. However, these traditional metal flush valves do have some drawbacks. For example, with continued use, metal valves may corrode or rust, and/or develop mineral deposits, which can require replacement of the entire valve. Additionally, such metal valves are typically expensive to manufacture and maintain.

Additionally, many modern commodes and/or urinals are designed to operate most efficiently using a standard amount of water per flush, typically in the range of 1.5 to 2 gallons per flush. Therefore, known metal flush valves are designed to provide a selected amount of water per flush when the valve is new. However, with continued or prolonged use over time, or as the internal components of the metal valve wear, it is not uncommon for these known metal flush valves to provide a different amount of water per flush than they were originally designed to provide. For example, a metal flush valve originally designed to provide 1.6 gallons per flush when new may eventually provide 2 or more gallons per flush due to valve component wear or use. For large applications, such as hospitals, prisons, apartment buildings, and the like, this can lead to an increase in water usage and cost. Additionally, these known flush valves cannot compensate for variations in water pressure during the flushing cycle that can also affect the amount of water per flush the valve provides.

Therefore, it would be advantageous to provide a flush valve system that reduces or eliminates at least some of the problems associated with known flush valves. For example, it would be advantageous to provide a flush valve that more accurately controls the amount of water provided per flush to ensure that, even following prolonged use, the valve continues to provide a chosen water volume. Furthermore, it would be advantageous to provide a flush valve configured to monitor and compensate for variations in water pressure during the flushing cycle to more accurately control flush volume. It would also be advantageous if these additional components did not substantially increase the electricity needed to operate the flush valve.

SUMMARY OF THE INVENTION

In accordance with an embodiment of the present invention, a flush valve system includes a flush valve having a valve body including a fluid inlet and a fluid outlet, and a main valve element adapted for transition, between a closed position, in which the fluid inlet and the fluid outlet are in fluid isolation, and an open position, in which the fluid inlet and the fluid outlet are in fluid communication. The flush valve also includes a vent system having a control chamber in fluid communication with the fluid inlet of the valve body, and a vent outlet in fluid communication with the fluid outlet of the valve body. The flush valve also includes an electronically operated solenoid adapted to establish fluid communication between the control chamber and the vent outlet to establish a pressure differential across a portion of the main valve element. The system further includes a power supply for energizing to the solenoid, a deployable actuator in communication with the power supply, and a microprocessor in electrical communication with the valve. The microprocessor is adapted to determine a valve opening time $T_{Open}$, the valve opening time being the period of time from when the power is supplied to the solenoid to when the piston opens the vent outlet, calculates a fluid pressure in the vent system based on $T_{Open}$, and causes operation of the valve to deliver a predetermined quantity of fluid through the valve based on the fluid pressure within the vent system.

In certain configurations, operation of the valve includes transitioning the main valve element from the closed position to the open position. Transition of the main valve element from the closed position to the open position may be initiated by a pressure differential across at least a portion of the main valve element. The solenoid of the system may include a piston configured to open the vent outlet when the solenoid is energized to establish fluid communication between the control chamber and the vent outlet.

The microprocessor may be further adapted to calculate a valve flush time $T_{Flush}$ associated with delivering the predetermined quantity of fluid through the valve based on the calculated fluid pressure. The microprocessor may also be further adapted to initiate closing of the vent outlet after the valve flush time $T_{Flush}$ elapses. Furthermore, the microprocessor may be further adapted to adjust a pulse width for energizing the solenoid based on the calculated fluid pressure. In certain configurations, the predetermined quantity of fluid of the system is 1.6 gallons. In certain other configurations, the system also includes a manual override lever operatively connected to the solenoid.

In accordance with another embodiment of the present invention, a method of operating a flush valve in a waste water system includes the steps of providing a valve including a fluid inlet and a fluid outlet, and a main valve element adapted for transition between a closed position, in which the fluid inlet and the fluid outlet are in fluid isolation, and an open position, in which the fluid inlet and the fluid outlet are in fluid communication. The valve also includes a control chamber in fluid communication with the fluid inlet, a vent outlet in fluid communication with the fluid outlet, and an electronically operated solenoid having a piston configured to open the vent outlet when the solenoid is energized to establish fluid communication between the control chamber and the vent outlet. The method may also include the steps of energizing the solenoid by supplying power to the solenoid, and determining a valve opening time $T_{Open}$, the valve opening time being the period of time from when the power is supplied to the solenoid to when the piston opens the vent outlet. The method may further include the steps of calculating a fluid pressure based on $T_{Open}$, calculating a valve flush time $T_{Flush}$ associated with delivering a predetermined quantity of fluid through the valve based on the calculated fluid pressure, and closing the vent outlet after the valve flush time $T_{Flush}$ elapses.

In certain configurations, the predetermined quantity of fluid utilized by the method is 1.6 gallons. The step of determining a valve opening time $T_{Open}$ may include measuring the time from when power is supplied to the solenoid to when a disruption in at least one of current and voltage occurs. In this configuration, the predetermined quantity of fluid may also be 1.6 gallons.

The method may also include a step of adjusting a pulse width for supplying power to the solenoid based on the valve opening time $T_{Open}$. The method may further include a step of adjusting a pulse width for supplying power to the solenoid based on the fluid pressure. Transition of the main valve element from the closed position to the open position may be initiated by a pressure differential across at least a portion of the main valve element. In certain configurations, the solenoid is adapted to establish fluid communication between the control chamber and the vent outlet to establish the pressure differential across a portion of the main valve element. The system utilized by the method may also include a manual override lever operatively connected to the solenoid.

BRIEF DESCRIPTION OF THE DRAWINGS

Additional advantages and details of the invention are explained in greater detail below with reference to the exemplary embodiments that are illustrated in the accompanying schematic figures.

DETAILED DESCRIPTION OF THE INVENTION

Figure 1:
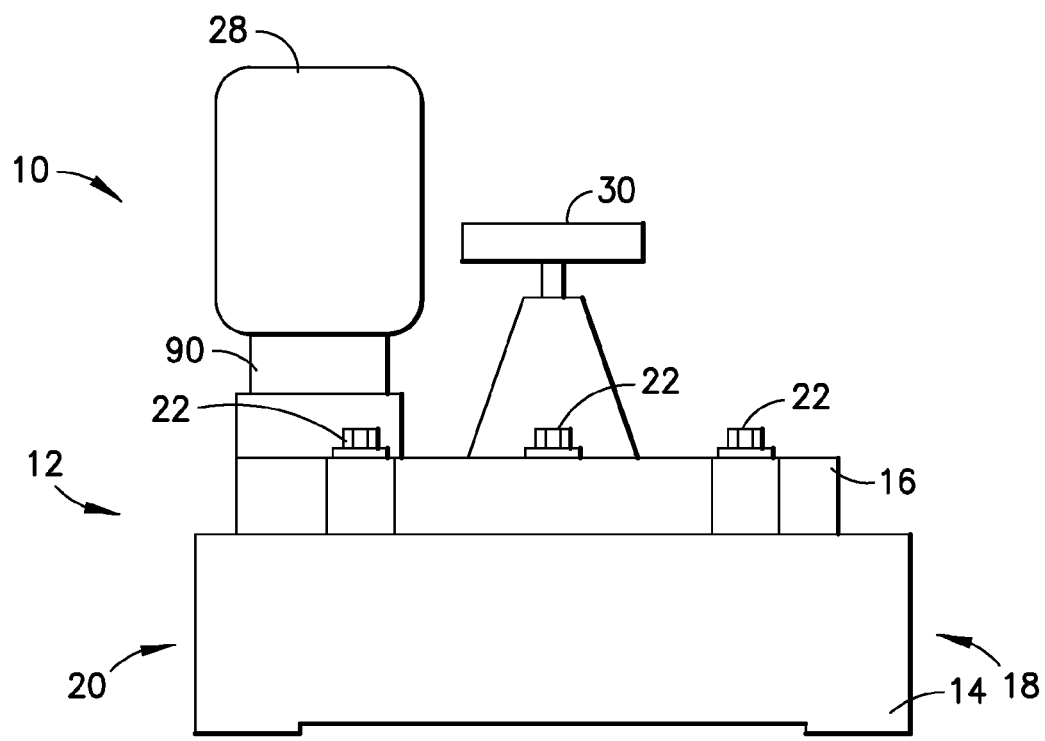
FIG. 1 is a left side view of a plastic bodied valve incorporating features of the invention.
Figure 2:
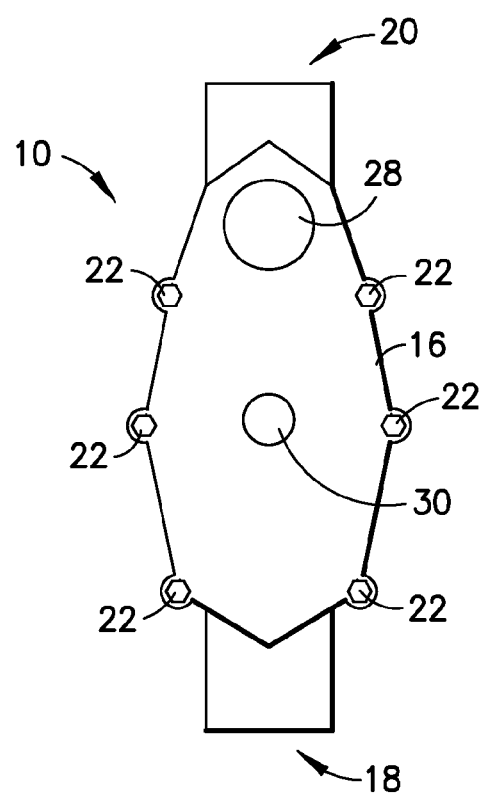
FIG. 2 is a top view of the valve of FIG. 1.
Figure 3:
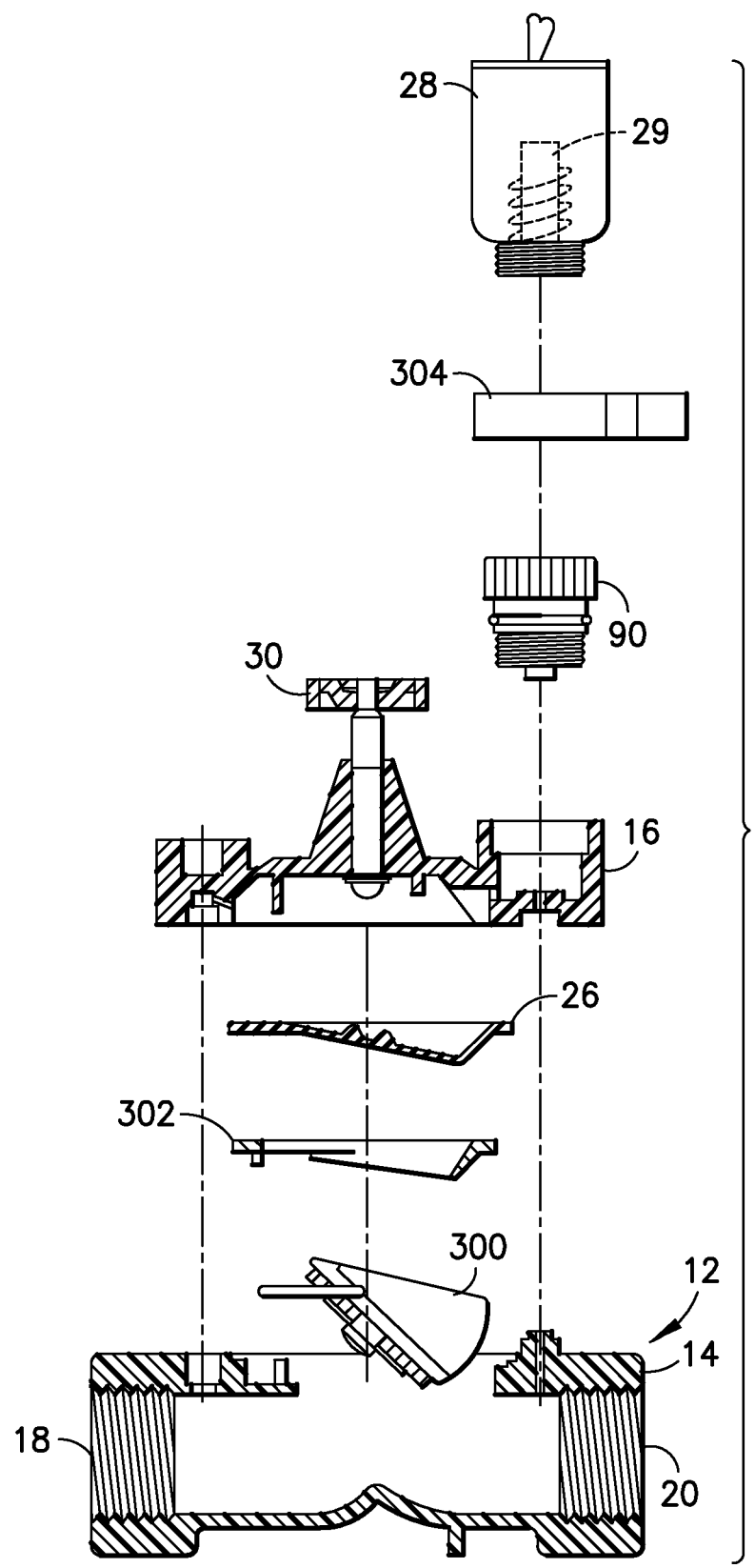
FIG. 3 is an exploded, partially sectional right side view of the valve of FIG. 1.

As used herein, spatial or directional terms, such as "up", "down", "above", "below", "top", "bottom", and the like, relate to the invention as it is shown in the drawing figures. However, it is to be understood that the invention can assume various alternative orientations and, accordingly, such terms are not to be considered as limiting.

Further, all numbers expressing dimensions, physical characteristics, processing parameters, quantities of ingredients, reaction conditions, and the like, used in the specification and claims are to be understood as being modified in all instances by the term "about". Accordingly, unless indicated to the contrary, the numerical values set forth in the following specification and claims are approximations that can vary depending upon the desired properties sought to be obtained by the present invention. At the very least, and not as an attempt to limit the application of the doctrine of equivalents to the scope of the claims, each numerical value should at least be construed in light of the number of reported significant digits and by applying ordinary rounding techniques. Moreover, all ranges disclosed herein are to be understood to encompass any and all subranges subsumed therein. For example, a stated range of "1 to 10" should be considered to include any and all subranges between (and inclusive of) the minimum value of 1 and the maximum value of 10; that is, all subranges beginning with a minimum value of 1 or more and ending with a maximum value of 10 or less, e.g., 1 to 6.1, 3.5 to 7.8, 5.5 to 10, etc. All references referred to herein, such as, but not limited to, issued patents and published applications, are to be understood to be incorporated by reference in their entirety.

FIGS. 1-5 illustrate a valve 10 of the present invention. The basic components of the valve 10 will first be described in order to clarify the subsequent discussion of the invention.

In one non-limiting embodiment, the valve 10, such as a diaphragm-type valve has a valve housing 12 formed by a valve body 14 and a cover 16. The valve body 14 and/or cover 16 can be of any desired material, for example, metal or plastic. In one non-limiting embodiment, the valve body 14 and cover 16 can both be made of plastic or one can be plastic and the other metal. The valve body 14 has a flow passage extending therethrough with an inlet end 18 and an outlet end 20. The cover 16 is connected to the valve body 14 by a plurality of bolts 22, such as aluminum or stainless steel bolts, threadably engagable with the valve body 14. A diaphragm 26 of suitable material, such as rubber or plastic, is sandwiched between the valve body 14 and the cover 16 to form a seal between the two chambers of the valve 10. A valve element 300 is positioned in the flow passage and the upper side of the valve element 300 engages the central region of the diaphragm 26 when the valve 10 is assembled. In one embodiment, the valve element 300 is a conventional swing check valve.

The valve 10 further includes a solenoid 28 threadably attached to the cover 16 and operationally connected with a vent system (as described below) to control water pressure in a control chamber formed above the diaphragm 26, as is typical in known diaphragm valves. As will be described in more detail below, in one non-limiting embodiment the vent system includes a passage, such as a crescent-shaped vent passage, in flow communication with the control chamber and with a vent chamber. Flow through a vent outlet for the vent chamber is controlled by a plunger 29 associated with the solenoid 28, which can be moved to open or close a vent outlet, as will be described herein. A manual override lever 304 can be operatively connected to the solenoid 28.

Figure 4:
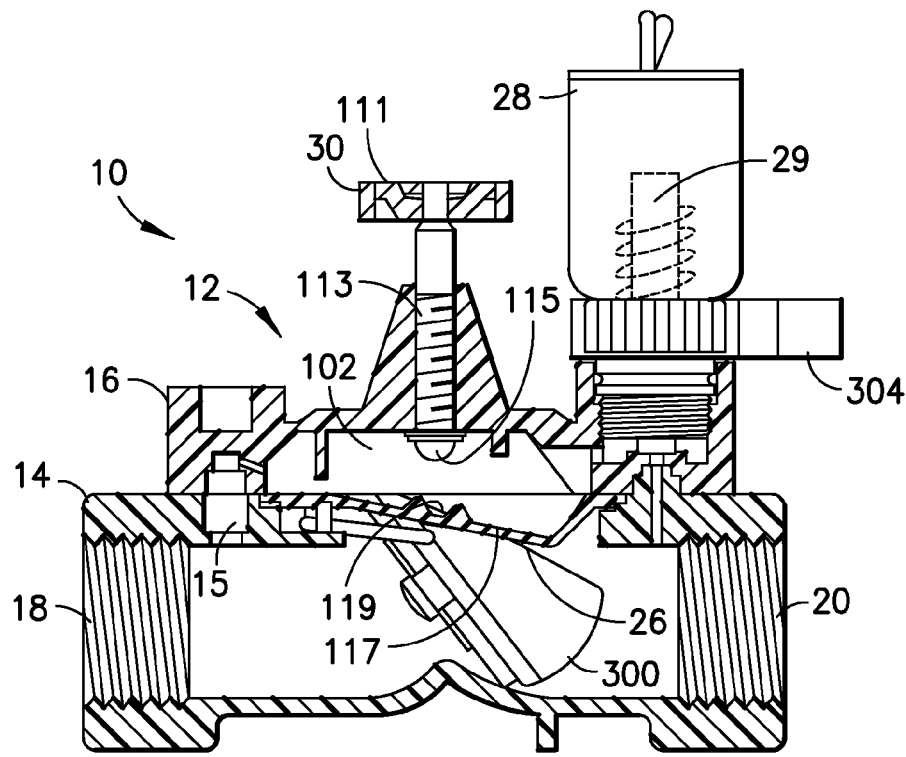
FIG. 4 is a right side, sectional view of the valve of FIG. 1 in a closed configuration.
Figure 5:
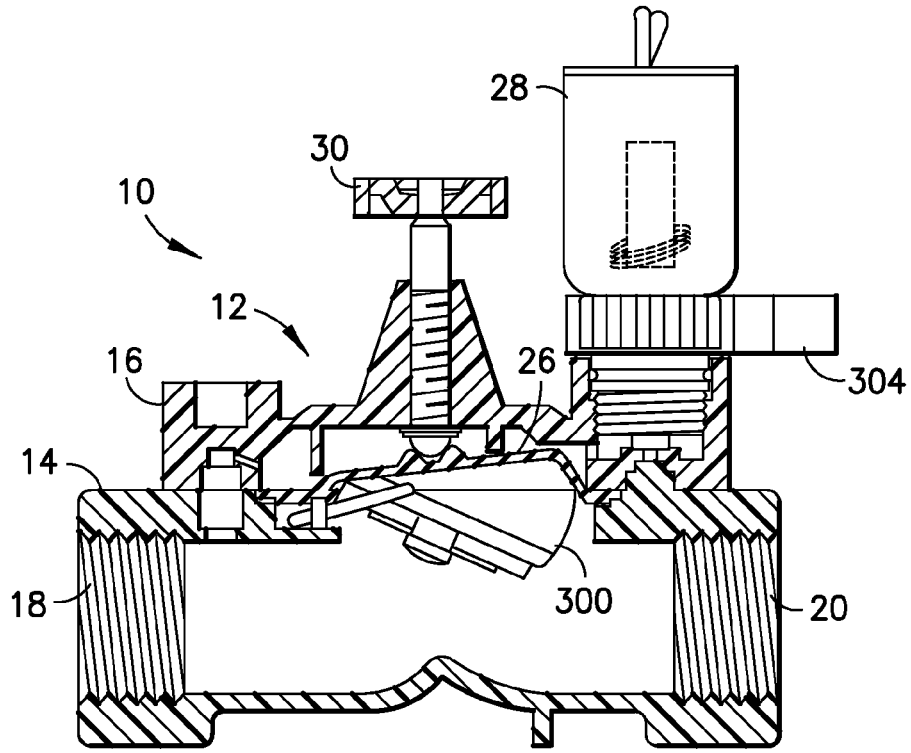
FIG. 5 is a right side, sectional view of the valve of FIG. 1 in an open configuration.

FIG. 4 shows the valve 10 in a closed configuration in which the valve element 300 blocks the flow passage, preventing fluid flow through the valve 10. FIG. 5 shows the valve 10 in an open configuration in which fluid can flow from the inlet end 18, through the flow passage, and out the outlet end 20.

With specific reference to FIG. 4, the valve 10 may also include a rotatable stop 30 that can be used to adjust or control the maximum opening position of the valve element 300. The rotatable stop 30 may be threadedly advanceable within a portion of the valve body 14 into an interior 102. The rotatable stop 30 may include a turning member 111 engaged with an advancing member 113 having an engagement stop 115 at a distal end thereof. In one configuration, the engagement stop 115 is configured to contact and stop further advancement of a proximal portion 117 of the valve element 300. In certain embodiments, the proximal portion 117 includes a recess 119 for engagement with the engagement stop 115. In use, once the engagement stop 115 contacts the proximal portion 117, such as in recess 119, further transition of the valve element 300 is prohibited.

The above-described diaphragm valve basic components and their operation will be well understood by one of ordinary skill in the diaphragm valve art and, hence, will not be described in any great detail. Examples of known diaphragm valves and their operation are described, for example, in U.S. Pat. Nos. 4,336,918; 4,301,992; 4,893,645; 4,797,820; 4,477,051; 4,787,413; 5,853,026; and 6,557,580. However, unlike conventional diaphragm valves, the valve 10 of the present invention includes operational elements and/or a relief system, as will now be described, which make the valve 10 particularly useful as a flush valve in a waste water system.

Figure 6:
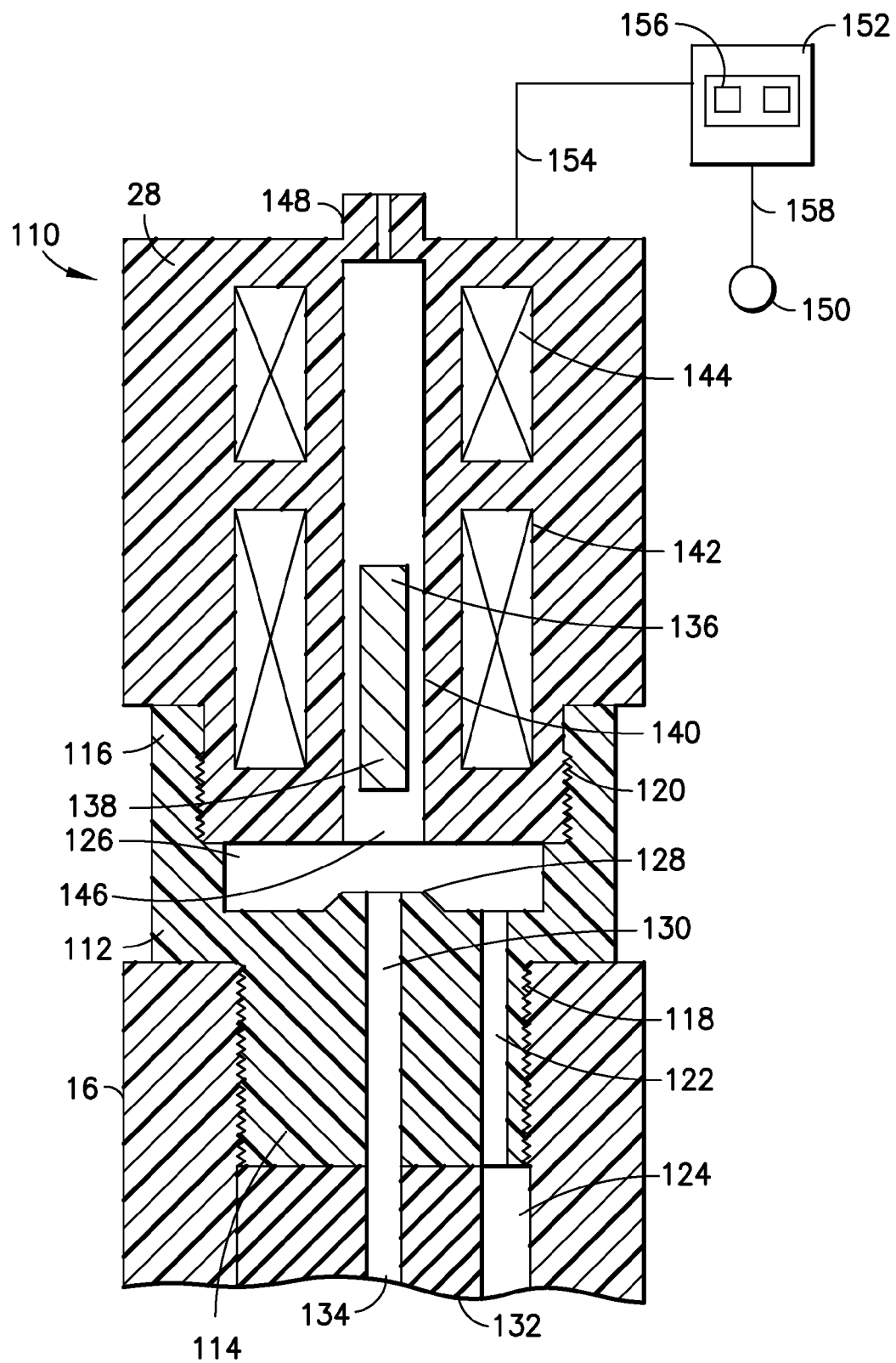
FIG. 6 is a side, cut-away view (not to scale) of a portion of a valve incorporating an electronic valve relief system of the invention.

A portion of the valve 10 of the invention incorporating a pressure relief assembly 110 is shown in FIG. 6. As shown in FIG. 6, a bleed plug 112 or fitting has a first end 114 and a second end 116. The first end 114 is connectable with the valve 10, such as with the cover 16, and the second end 116 engages the solenoid 28. In the embodiment illustrated in FIG. 6, the first end 114 of the plug 112 has external threads 118 configured to engage threads on the cover 16, and the second end 116 has internal threads 120 configured to engage threads on the solenoid 28. The valve 10 has a vent system incorporating a vent inlet passage 122 with one end (lower end) in flow communication with a control chamber 124 and the other end (upper end) in flow communication with a vent chamber 126. A vent valve seat 128 is located in the vent chamber 126 and is in flow communication with a vent outlet conduit 130. When the plug 112 is engaged with the cover 16, the first end 114 of the plug 112 contacts a raised sealing member 132. An outlet conduit 134 in the sealing member 132 aligns with the lower end of the vent outlet conduit 130 in the plug 112.

Flow through the vent outlet conduit 130 is controlled by a piston 136 of the solenoid 28 having a plunger 138. The piston 136 is slidable within a core tube 140 surrounded by a coil, as is conventional in many solenoids. The coil can be a single coil or, in the illustrated embodiment of FIG. 6, the coil can comprise a first coil section 142 and a second coil section 144. The first coil section 142 is located at or near the bottom or open end 146 of the core tube 140. The second coil section 144 is located at or near the top or closed end 148 of the core tube 140. When the plunger 138 of the piston 136 is engaged with the vent valve seat 128, flow to the vent outlet conduit 130 is prevented. The fluid pressure in the control chamber 124 is built up to be equal to the fluid pressure of the fluid supply source entering valve 10 through inlet end 18. In particular, fluid flows into valve 10 through inlet end 18, through a chamber inlet 15 (FIG. 4) and into control chamber 124 above diaphragm 26. Control chamber 124 extends across the top of valve 10 over diaphragm 26 and into the portion of valve 10 which is threaded to the solenoid 28. With the piston 136 of solenoid 28 seated on vent valve seat 128, vent chamber 126 is closed from fluid communication across vent valve seat 128. The control chamber 124 is therefore closed as well. The fluid pressure within control chamber 124 applies a force across diaphragm 26, maintaining the diaphragm 26 in an extending position and preventing it from lifting, thereby maintaining a swing check valve 302 (FIG. 3) in a downward state and preventing the swing check valve 302 from lifting. When the piston 136 is retracted (i.e., moves in an upward direction), such as by energizing the coils 142, 144 of the solenoid 28, fluid communication is established between vent chamber 126 and vent outlet conduit 130. Once fluid flow is established, fluid passes from the vent inlet passage 122, through the vent chamber 126, and out the outlet conduit 134 and into the outlet end 20 of the valve 10. From the outlet end 20 the fluid passes to a fixture associated with valve 10, such as a conventional toilet. The vent system is used to bleed pressure from the control chamber 124 to open the main valve element in the valve body 14. This allows the valve element 300 to be opened and closed to control fluid flow through the valve 10.

In a non-limiting embodiment, the solenoid 28 is connected to an actuator 150, such as a conventional push-button actuator, to effect actuation of the valve 10, such as to effect flushing of an attached toilet. Other actuation devices which may be coupled to the solenoid 28 include, but are not limited to, a timer for actuating the valve 10 at predetermined intervals or a motion detection device. The actuator 150 sends an electrical signal to the coils 142, 144 which energizes the coils 142, 144, thereby causing the plunger 138 to lift from the vent valve seat 128 to initiate the flush process. To close the main valve element 300, the solenoid 28 is disengaged (i.e., the coils 142, 144 are de-energized) causing the plunger 138 to re-engage the vent valve seat 128 to close the vent outlet conduit 130. Closing the main valve element 300 closes off any fluid flow therethrough, thereby allowing fluid, i.e. water, to re-accumulate in vent chamber 126, and re-pressurizing the control chamber 124 above diaphragm 26 and closing swing check valve 302.

The electronic pressure relief assembly 110 also includes a control board 152. The control board 152 can be, for example, a conventional 410 or 810 control board, as is known in the art. The control board 152 is connected to an electrical power source to provide electrical power to the solenoid 28 in any conventional manner, such as by one or more cables 154. The power source may be, for example, a battery (not shown). The control board 152 is in electronic communication, such as by a wire or actuator cable 158, with the actuator 150. In certain embodiments, as shown in FIG. 6, the control board 152 is separate from the valve 10. Alternatively, the control board 152 may be disposed within the valve 10 or on an external portion of the valve 10.

When the actuator 150 is engaged, such as when a user presses an on/off button, the control board 152 sends a signal via a cable 154 to the solenoid 28 to energize the coils 142, 144 to lift the plunger 138 off of the valve seat 128. This vents the fluid in the vent chamber 126 through the vent outlet conduit 130, thereby venting the control chamber 124 and opening the valve element 300 of the valve 10. In certain embodiments, the solenoid 28 is automatically controlled by a microprocessor 156 which actuates the solenoid 28. For example, the microprocessor 156 may be configured to actuate the valve 10 at specific times or when receiving an electronic signal from another actuation device such as a motion detecting device.

In certain configurations, the electronic pressure relief assembly 110 may be incorporated into a portion of the valve 10 adjacent other electronically operated features of the valve 10, such as adjacent to or integrated with the solenoid 28 portion of the valve 10. In this manner, a conventional valve such as disclosed in U.S. Pat. No. 4,336,918 can be easily modified and retrofitted by replacing a conventional solenoid operator with a modified solenoid incorporating an electronic pressure relief assembly as disclosed in the present invention.

The electronic pressure relief assembly 110 further includes electrical components for determining the pressure within the control chamber 124. By monitoring pressure within the control chamber 124, the amount of water flowing through the valve 10 can be effectively approximated and controlled.

More particularly, the precise volume of fluid flow through the valve 10 per flush $V_{Flush}$ can be calculated based on the interior volume of the valve 10, the period of time that the valve 10 remains open $T_{Flush}$, and the fluid pressure of the water flowing through the valve 10. As described above, in certain embodiments, the valve 10 is configured to expel 1.6 gallons of water ($V_{Flush}$=1.6 gallons). By monitoring the fluid pressure within the valve 10 during operation of the valve 10, the operating time of the valve 10 ($T_{Flush}$) can be adjusted to ensure that the desired flow volume is achieved. As described above, fluid pressure can fluctuate for a number of reasons including when multiple fixtures attached to the same water source are used simultaneously, the age and/or wear of the water system, or a partial blockage of the water system. The valve 10 is configured to account for such changes in pressure.

In previously known flush valves, fluid pressure was monitored using a pressure transducer electronically connected to the control board 152 and microprocessor 156 to continually or intermittently measure fluid pressure. The directly measured fluid pressure was used to calculate the correct flush time $T_{Flush}$ for the predetermined desired flush volume $V_{Flush}$.

The presently invented pressure relief assembly 110 is configured to determine fluid pressure without the use of a separate pressure transducer. In one non-limiting embodiment, the microprocessor 156 is configured to measure the opening time $T_{Open}$ of the valve 10. The valve opening time $T_{Open}$ is defined as the time from when power is supplied to the solenoid 28 to when the plunger 138 disengages the vent valve seat 128. It has been determined that the combination of valve opening time $T_{Open}$ and power $P_{Solenoid}$ supplied to the solenoid 28 corresponds to the fluid pressure within the valve 10. Indirectly measuring fluid pressure in this way reduces the cost of the valve 10 since a separate pressure transducer is no longer required. The power required by the electronic pressure relief assembly 110 is also reduced since excess power is no longer required for the separate pressure transducer.

Figure 7:
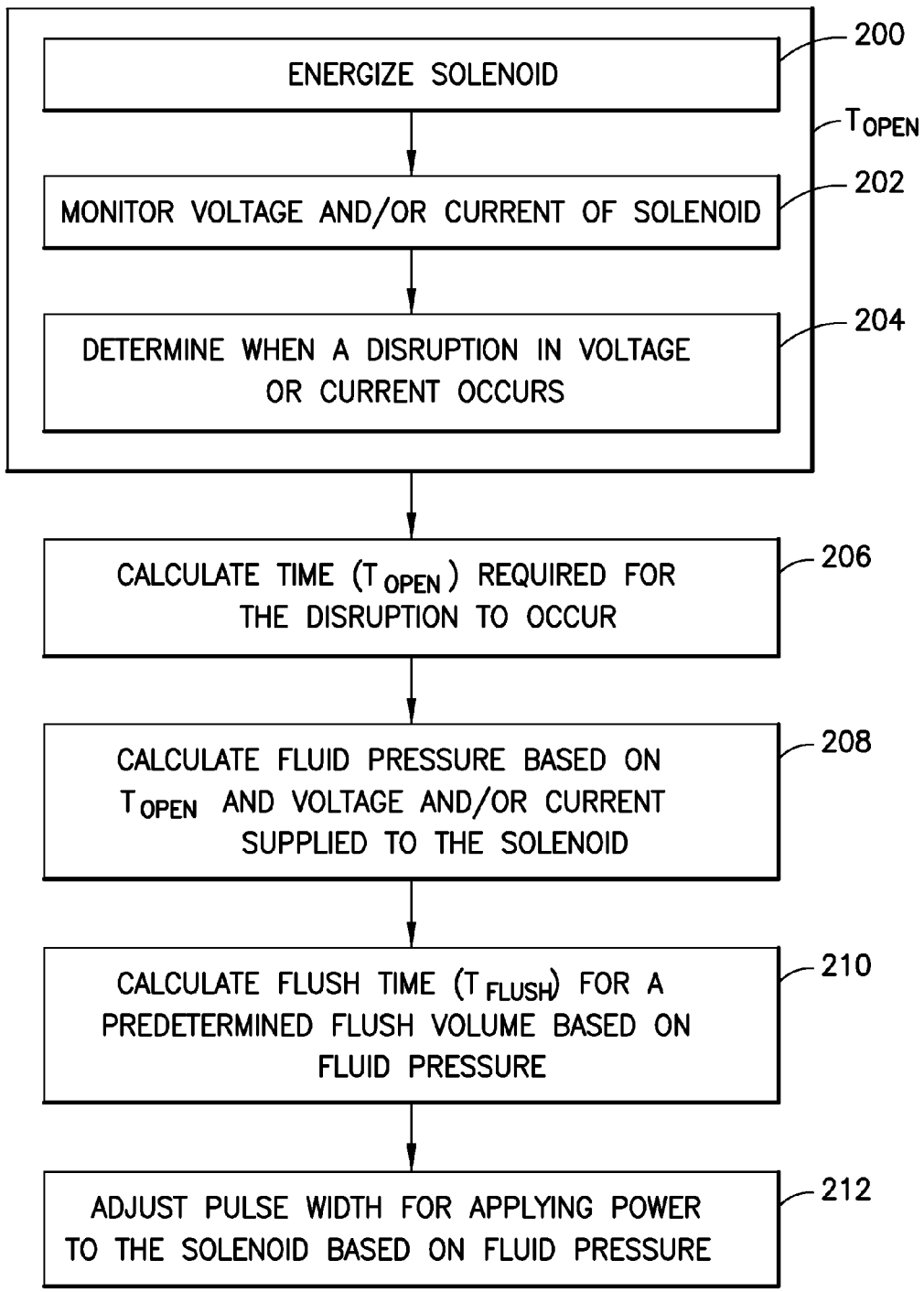
FIG. 7 is a flow chart depicting the steps for determining fluid output volume of a flush valve according to the method of the present invention.

More particularly, a method for determining fluid pressure within the valve 10 by measuring valve opening time $T_{Open}$ will now be described. A flow chart depicting the steps for determining fluid pressure in the valve 10 is also depicted in FIG. 7. Initially, the valve 10 is actuated by the actuator 150 or microprocessor 156 according to the steps described above. In response to the actuation activity, the solenoid 28 is energized at step 200, meaning that power $P_{Solenoid}$ is supplied to the solenoid 28. The solenoid 28 may include a sensor for monitoring the power accumulated by the solenoid 28 as shown in step 202. As energy accumulates on the solenoid 28, the lifting force applied to the piston 136 increases, eventually causing the piston 136 to disengage from the seat 128. When the piston 136 disengages, the solenoid 28 and the piston 136 move upward through the core tube 140. The upward movement of the piston 136, past coils 142, 144, disrupts the magnetic flux of the solenoid 28 causing a disturbance in the power supplied to the solenoid 28 in step 204. Therefore, monitoring the disturbance in the solenoid 28 charge provides an effective indication of when the piston 136 disengages from the seat 128.

Figure 8:
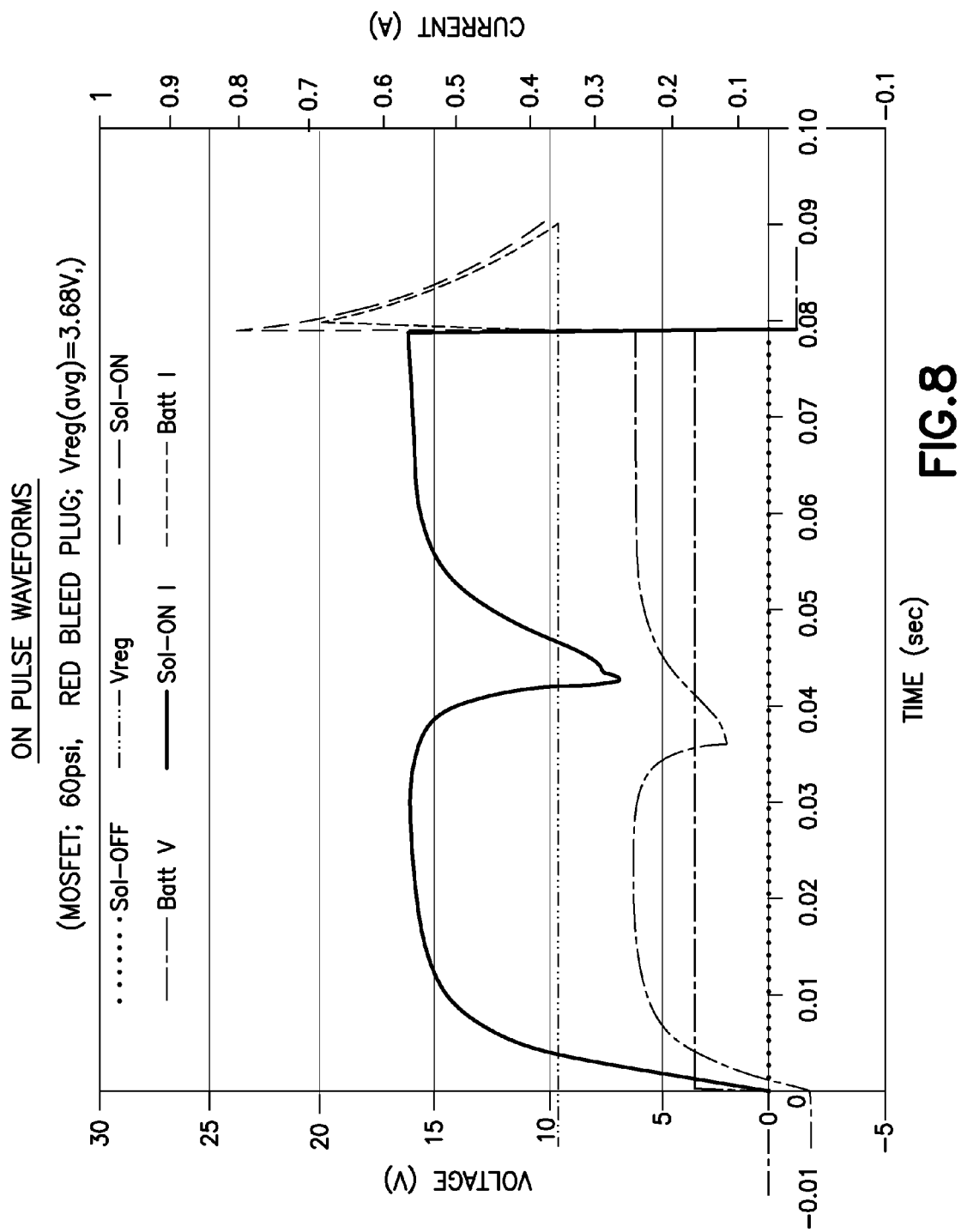
FIG. 8 is a graph depicting the voltage and current of a solenoid during operation of the valve in accordance with an embodiment of the invention.
Figure 9:
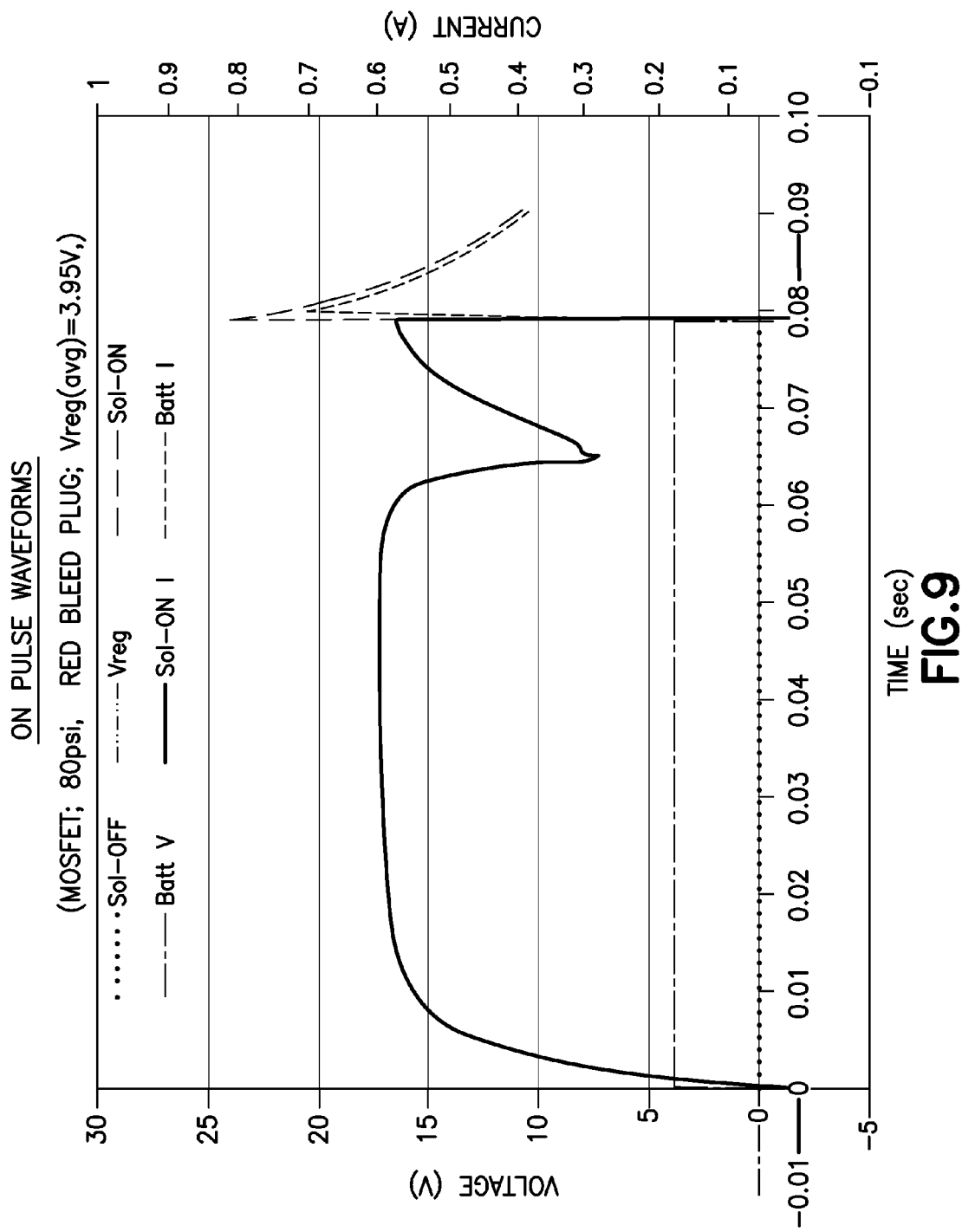
FIG. 9 is a graph depicting the voltage and current of the solenoid during operation of the valve in accordance with a further embodiment of the invention.

Charts depicting a change in solenoid 28 power ($P_{Solenoid}$) over time are depicted in FIGS. 8 and 9. As depicted in FIGS. 8 and 9, power accumulates at the solenoid 28 beginning when actuation occurs (i.e., at time=0 seconds). The voltage or current gradually increases until a disturbance occurs. In FIG. 8, the disturbance, indicated by a drop in voltage and current, occurs at about 0.06 seconds. In FIG. 9, the disturbance occurs at 0.04 seconds. The disturbance corresponds to the disengagement of the piston 136 from the seat 128. The microprocessor 156 is configured to monitor voltage and/or current as the solenoid 28 is receiving power. The microprocessor 156 is also configured to measure the time until the disturbance in voltage and/or current is observed. The calculation of time ($T_{Open}$) required for the disruption to occur is shown in step 206 of FIG. 7.

An additional benefit of detecting the disruption and shutting off the power to the solenoid as the disruption occurs, or just slightly after it occurs, is a significant saving in battery power. For example, if a standard pulse width of 100 ms is routinely used to ensure the solenoid can open at a level of 120 Psi, but the actual installation in a facility is at 60 Psi, then 100 ms of power is being used by the valve, but the valve will open after only 50 ms, the interval at which the disruption occurs. This results in the second half of the 100 ms, i.e., 50 ms of power, being wasted. If the power is shut off at or near the point of disruption, then the power ultimately used is dynamically responsive to the power required to obtain the disruption.

Once the opening time is determined, the microprocessor 156 is configured to indirectly determine the valve pressure based on an experimentally determined correlation between valve opening time and pressure. Calculation of the fluid pressure based on $T_{Open}$ and volatage and/or current supplied to the solenoid is calculated in step 208 of FIG. 7. For example, in one-embodiment of the presently invented valve, it has been experimentally determined that an opening time of 0.04 seconds corresponds to a pressure of about 60 Psi. An opening time of 0.065 seconds corresponds to about 80 Psi. An opening time of 0.085 seconds corresponds to pressure of about 125 Psi.

Once the fluid pressure is indirectly determined, the total time that the valve 10 must remain open for the predetermined amount of water to pass through the valve 10 is easily calculated. The calculation of the flush time $T_{Flush}$ for a predetermined flush volume based on fluid pressure is shown in step 210 of FIG. 7. If the pressure is determined to be 50 Psi, the microprocessor 156 would actuate the solenoid 28 for a first predetermined period of time. If the fluid pressure is determined to be 60 Psi, the microprocessor 156 would actuate that the solenoid 28 for a second predetermined period of time, which would be greater than the first predetermined period of time, in order to provide the same amount of water through the valve 10. After the calculated amount of time passes, the solenoid 28 is de-energized, causing the piston 136 to re-engage with the seat 128.

The presently invented method of monitoring water pressure in the valve 10 effectively conserves water by ensuring that only the desired amount of water is released through the valve 10. In addition, power is conserved because a separate pressure transducer is not needed to monitor fluid pressure. A further advantage of recognizing the correlation between opening time for the solenoid 28 and fluid pressure is that the correlation can be used to reduce total power requirements for the solenoid 28. In a conventional solenoid valve, a standard pulse width for disengaging the piston from the seat is chosen. To ensure that the solenoid 28 opens effectively even as pressure increases, the chosen pulse width should be sufficient to disengage the solenoid 28 at the maximum anticipated pressure which the valve 10 could experience. By means of example, for the valve 10 of the present invention, a pulse width on the order of 0.1 seconds may be chosen. However, as described above, and as shown in FIGS. 8 and 9, the time required to disengage the solenoid 28 is generally far less than 0.1 seconds. Nevertheless, power is supplied to the solenoid 28 for the entire pulse duration regardless of how long it takes for the solenoid 28 to disengage. In contrast, with the presently invented method, the pulse width can be automatically reduced based on the determined fluid pressure. The adjustment of the pulse width for applying power to the solenoid based on fluid pressure is shown in step 212 of FIG. 7. For example, if the fluid pressure is determined to be 60 Psi, the pulse width could be reduced to 0.04 seconds, effectively reducing power used when opening the valve 10 by over half. If the pressure in the valve 10 increases, the pulse width could be increased accordingly.

It will be readily appreciated by those skilled in the art that modifications may be made to the invention without departing from the concepts disclosed in the foregoing description. For example, various components of the mechanical and electronic relief devices described above can be used together in the same valve. Accordingly, the particular embodiments described in detail herein are illustrative only and are not limiting to the scope of the invention, which is to be given the full breadth of the appended claims and any and all equivalents thereof.

What is claimed is:

1. A flush valve system, comprising:
   a flush valve comprising:
      a valve body comprising a fluid inlet and a fluid outlet, and a main valve element adapted for transition between a closed position, in which the fluid inlet and the fluid outlet are in fluid isolation, and an open position, in which the fluid inlet and the fluid outlet are in fluid communication;
      a vent system comprising a control chamber in fluid communication with the fluid inlet of the valve body, and a vent outlet in fluid communication with the fluid outlet of the valve body; and
      an electronically operated solenoid adapted to establish fluid communication between the control chamber and the vent outlet to establish a pressure differential across a portion of the main valve element;
   a power supply for energizing the solenoid;
   an actuator in communication with the power supply; and
   a microprocessor in electrical communication with the flush valve adapted to:
      determine a valve opening time $T_{Open}$, the valve opening time being the period of time from when power is supplied to the solenoid to when a piston opens the vent outlet,
      calculate a fluid pressure in the vent system based on $T_{Open}$,
      cause operation of the flush valve to deliver a predetermined quantity of fluid through the flush valve based on the fluid pressure within the vent system, and
      adjust a pulse width for energizing the solenoid based on the calculated fluid pressure.

2. The flush valve system of claim 1, wherein operation of the flush valve comprises transitioning the main valve element from the closed position to the open position.

3. The flush valve system of claim 2, wherein transition of the main valve element from the closed position to the open position is initiated by a pressure differential across at least a portion of the main valve element.

4. The flush valve system of claim 3, wherein the solenoid comprises the piston configured to open the vent outlet when the solenoid is energized to establish fluid communication between the control chamber and the vent outlet.

5. The flush valve system of claim 1, wherein the microprocessor is further adapted to calculate a valve flush time $T_{Flush}$ associated with delivering the predetermined quantity of fluid through the flush valve based on the calculated fluid pressure.

6. The flush valve system of claim 5, wherein the microprocessor is further adapted to initiate closing of the vent outlet after the valve flush time $T_{Flush}$ elapses.

7. The flush valve system of claim 1, wherein the predetermined quantity of fluid is 1.6 gallons.

8. The flush valve system of claim 1, further comprising a manual override lever operatively connected to the solenoid.

9. A method of operating a flush valve in a waste water system comprising:
   providing a flush valve including:
      a fluid inlet and a fluid outlet, and a main valve element adapted for transition between a closed position, in which the fluid inlet and the fluid outlet are in fluid isolation, and an open position, in which the fluid inlet and the fluid outlet are in fluid communication;
      a control chamber in fluid communication with the fluid inlet;
      a vent outlet in fluid communication with the fluid outlet; and
      an electronically operated solenoid having a piston configured to open the vent outlet when the solenoid is energized to establish fluid communication between the control chamber and the vent outlet;
   energizing the solenoid by supplying power to the solenoid;
   determining a valve opening time $T_{Open}$, the valve opening time being the period of time from when power is supplied to the solenoid to when the piston opens the vent outlet;
   calculating a fluid pressure based on $T_{Open}$;
   calculating a valve flush time $T_{Flush}$ associated with delivering a predetermined quantity of fluid through the flush valve based on the calculated fluid pressure;
   closing the vent outlet after the valve flush time $T_{Flush}$ elapses; and
   adjusting a pulse width for supplying power to the solenoid based on the fluid pressure.

10. The method of claim 9, wherein the predetermined quantity of fluid is 1.6 gallons.

11. The method of claim 9, wherein the step of determining a valve opening time $T_{Open}$ comprises measuring the time from when power is supplied to the solenoid to when a disruption in at least one of current and voltage occurs.

12. The method of claim 11, wherein the predetermined quantity of fluid is 1.6 gallons.

13. The method of claim 9, wherein transition of the main valve element from the closed position to the open position is initiated by a pressure differential across at least a portion of the main valve element.

14. The method of claim 9, wherein the solenoid is adapted to establish fluid communication between the control chamber and the vent outlet to establish a pressure differential across a portion of the main valve element.

15. The method of claim 9, further comprising a manual override lever operatively connected to the solenoid.

* * * * *